(No Model.)
H. B. WARD.
PIPE COUPLING.
No. 442,837.  Patented Dec. 16, 1890.
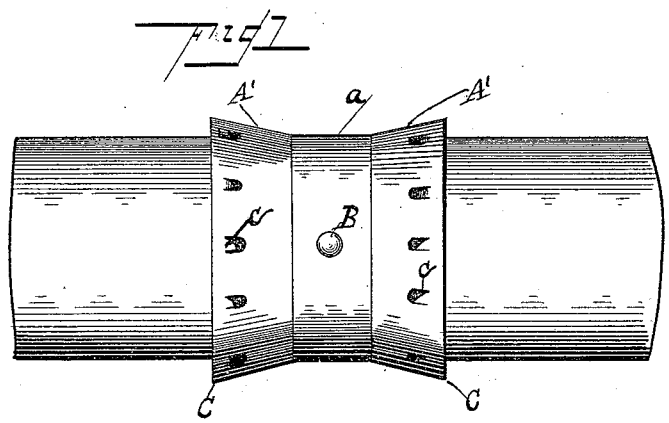
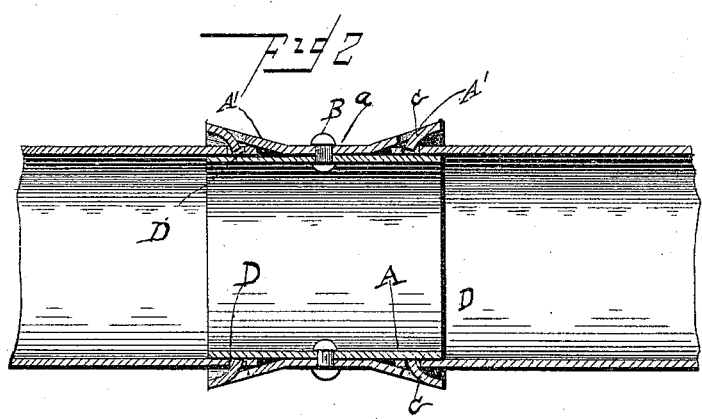
WITNESSES
T. Willoughby
J. F. Reily
H. B. Ward
INVENTOR
By W. Fitzgerald
Attorney

UNITED STATES PATENT OFFICE.

HENRY BEECHER WARD, OF SAN DIEGO, CALIFORNIA.

PIPE-COUPLING.

SPECIFICATION forming part of Letters Patent No. 442,837, dated December 16, 1890.

Application filed April 23, 1890. Serial No. 349,064. (No model.)

*To all whom it may concern:*

Be it known that I, HENRY BEECHER WARD, a citizen of the United States, residing at San Diego, in the county of San Diego and State of California, have invented certain new and useful Improvements in Pipe-Couplings; and I do hereby declare that the following is a full, clear, and exact description of the invention, which will enable others skilled in the art to which it appertains to make and use the same.

My invention consists in a new and improved pipe-coupling, which will be hereinafter described and claimed.

Referring to the accompanying drawings, Figure 1 is a side view of my new and improved pipe-coupling, showing the ends of the two pipe-sections secured within it. Fig. 2 is a central longitudinal sectional view of the same.

The same letters of reference indicate corresponding parts in both the figures.

Referring to the several parts by letter, A indicates the sleeve or coupling proper, which is preferably formed of sheet metal, my invention being mainly intended for sheet-metal piping. This sleeve is in the form of a combined cone or of two truncated cones A' A', meeting at their smaller ends, and this outer sleeve is riveted at the center of its length by rivets B to a straight inner sleeve E, as clearly shown in Fig. 2. The flared ends C of said cones are so cut that a series of tongues c are formed around the same. The free ends of such tongues point inward and are adapted to be pressed downward into holes D, provided in the ends of the pipe.

The inside of the smaller end of each cone A' is coated with a thick coating of asbestus putty or cement C, or any other suitable cement may be employed in place of the asbestus cement, although this is preferable.

To couple lengths or sections of pipe together, it is only necessary to drive the ends of two pipe-sections D D into the coupling from each end thereof, when, owing to the conical shape of the two ends or parts of the coupling A, the ends of the pipe-sections fit or are wedged tighter and tighter in the coupling the farther they are driven in, as will be readily seen. When the ends of the pipe-sections have been securely driven in, the asbestus cement C, into which the ends of the pipe-sections have of course been forced, is allowed to harden and will perfectly secure the joint.

From the foregoing description, taken in connection with the accompanying drawings, the construction, operation, and advantages of my new and improved pipe-coupling will be readily understood.

It will be seen that my pipe-coupling is simple in construction and exceedingly efficient in operation, making a strong tight joint at the point where the ends of pipe-sections are coupled together.

It will be seen that my coupling can be applied and the ends of two pipe-sections coupled together in a very short space of time, thus effecting a great saving of time and labor.

Any number of pipe-sections can be secured together, making a line of any desired length without the slightest danger of leakage or breakage.

Having thus described my invention, what I claim, and desire to secure by Letters Patent, is—

1. In a pipe-coupling, the combination of the jacket A, formed with the series of inwardly-inclined locking-tongues c, and the pipes provided at their ends with the series of retaining-apertures D, substantially as and for the purpose set forth.

2. The combination, in a pipe-coupling, of the inner sleeve E, the outer sleeve riveted thereto, having the flaring ends and formed with the series of inwardly-inclined locking-tongues c, and the pipes provided at their ends with the series of apertures D, substantially as and for the purpose set forth.

HENRY BEECHER WARD.

Witnesses:
A. B. SMITH,
W. F. FITZGERALD.